United States Patent
Hung et al.

(10) Patent No.: US 10,503,308 B2
(45) Date of Patent: Dec. 10, 2019

(54) TOUCH APPARATUS AND TOUCH DETECTION INTEGRATED CIRCUIT THEREOF

(71) Applicant: Novatek Microelectronics Corp., Hsinchu (TW)

(72) Inventors: Ching-Ho Hung, Hsinchu (TW); Jiun-Jie Tsai, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 34 days.

(21) Appl. No.: 15/378,025

(22) Filed: Dec. 13, 2016

(65) Prior Publication Data
US 2018/0164943 A1    Jun. 14, 2018

(51) Int. Cl.
*G06F 3/041* (2006.01)
*G06K 9/00* (2006.01)
*G06F 3/044* (2006.01)

(52) U.S. Cl.
CPC ............ *G06F 3/0416* (2013.01); *G06F 3/044* (2013.01); *G06K 9/00013* (2013.01)

(58) Field of Classification Search
CPC ................... G06F 3/0416; G06F 3/044; G06F 2203/04106; G06K 9/00013; G06K 9/00087
See application file for complete search history.

(56) References Cited

U.S. PATENT DOCUMENTS

| 6,246,395 B1* | 6/2001 | Goyins | G06F 3/0488 345/173 |
| 6,360,004 B1 | 3/2002 | Akizuki | |
| 2009/0027353 A1* | 1/2009 | Im | G06F 3/0414 345/173 |
| 2010/0009658 A1 | 1/2010 | Wu et al. | |
| 2016/0148034 A1* | 5/2016 | Kremin | G06K 9/0002 382/124 |
| 2018/0035923 A1* | 2/2018 | Kang | A61B 5/117 |

* cited by examiner

*Primary Examiner* — Towfiq Elahi
(74) *Attorney, Agent, or Firm* — JCIPRNET

(57) ABSTRACT

A touch apparatus and a touch detection integrated circuit (IC) thereof are provided. The touch detection IC includes a driving signal generation circuit and a receiving circuit. The driving signal generation circuit is configured to transmit at least one first driving signal to a touch panel and a second driving signal to a fingerprint sensor. The receiving circuit receives and processes a touch signal of the touch panel during a first period when the driving signal generation circuit transmits the first driving signal to the touch panel. The receiving circuit receives and processes a fingerprint signal of the fingerprint sensor during a second period when the driving signal generation circuit transmits the second driving signal to the fingerprint sensor.

21 Claims, 4 Drawing Sheets

TOUCH APPARATUS AND TOUCH DETECTION INTEGRATED CIRCUIT THEREOF

BACKGROUND

Field of the Invention

The invention is directed to an integrated circuit (IC). More particularly, the invention is directed to a touch apparatus and a touch detection IC thereof.

Description of Related Art

Along with progress of technologies, the convenience and applicability of electronic apparatuses are progressively developed. An electronic apparatus is commonly equipped with a touch panel and other sensors (e.g., a fingerprint sensor). The touch panel and the fingerprint sensor pertains to two different modules. In a conventional circuit design of the electronic apparatus, the touch panel is controlled by a driving integrated circuit (IC) (i.e., a touch detection IC dedicated to the touch panel), and the fingerprint sensor is another IC (i.e., fingerprint sensor IC dedicated to acquire the fingerprint).

SUMMARY

The invention is directed to a touch apparatus and a touch detection integrated circuit (IC) thereof, in which a touch panel and a fingerprint sensor are driven/controlled by the same IC.

According to an embodiment of the invention, a touch detection IC is provided. The touch detection IC is configured to drive a touch panel to receive one or more touch signals of the touch panel and drive a fingerprint sensor to receive one or more fingerprint signals of the fingerprint sensor. The touch detection IC includes a driving signal generation circuit and one or more receiving circuits. The driving signal generation circuit is configured to transmit one or more first driving signals to the touch panel and transmit one or more second driving signals to the fingerprint sensor. The receiving circuits receive and process the touch signals of the touch panel during a first period. The receiving circuits receive and process the fingerprint signals of the fingerprint sensor during a second period.

According to an embodiment of the invention, a touch apparatus is provided. The touch apparatus includes a system processor, a touch panel, a fingerprint sensor and a touch detection IC. The touch detection IC is coupled to the system processor through an interface. The touch detection IC is further coupled to the touch panel. The touch detection IC is configured to drive the touch panel to receive one or more touch signals of the touch panel and drive the fingerprint sensor to receive one or more fingerprint signals of the fingerprint sensor. The touch detection IC includes a driving signal generation circuit and at least one receiving circuit. The driving signal generation circuit is configured to transmit one or more first driving signals to a touch panel and transmit one or more second driving signals to a fingerprint sensor. The receiving circuit receives and processes the touch signals of the touch panel during a first period. The receiving circuit receives and processes the fingerprint signals of the fingerprint sensor during a second period.

To sum up, in the touch apparatus and the touch detection IC thereof provided by the embodiments of the invention, the driving signal generation circuit and the receiving circuit are deployed. The driving signal generation circuit and the receiving circuit can jointly perform a touch sensing operation of the touch panel and jointly perform a fingerprint sensing operation of the fingerprint sensor. Thereby, the same touch detection IC can be used for driving/controlling not only the touch panel, but also the fingerprint sensor. Thus, the touch detection IC can effectively save system cost of the touch apparatus.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
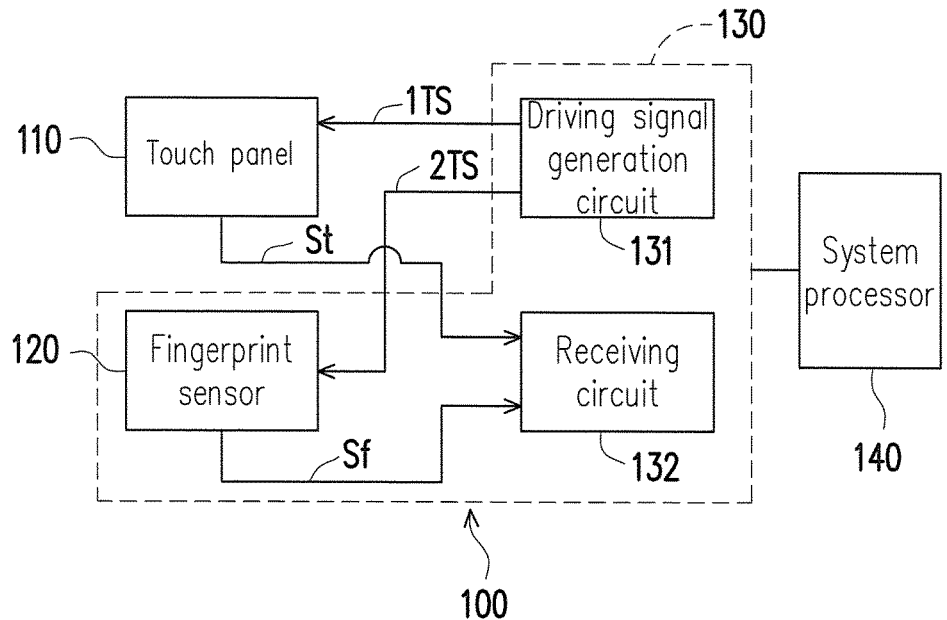
FIG. 1 is a schematic circuit block diagram illustrating a touch apparatus according to an embodiment of the invention.

The term "couple (or connect)" herein (including the claims) are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Moreover, elements/components/steps with same reference numerals represent same or similar parts in the drawings and embodiments. Elements/components/notations with the same reference numerals in different embodiments may be referenced to the related description.

FIG. 1 is a schematic circuit block diagram illustrating a touch apparatus 100 according to an embodiment of the invention. In the embodiment illustrated in FIG. 1, the touch apparatus 100 includes a touch panel 110, a touch detection integrated circuit (IC) 130 and a system processor 140. The system processor 140 is coupled to the touch detection IC 130 through an interface. Based on a design requirement, the interface may be a general purpose input/output (GPIO) interface circuit, inter integrated circuit ($I^2C$) interface circuit, serial peripheral interface (SPI) interface circuit or any other interface circuit. The system processor 140 may be a central processing unit (CPU), a digital signal processor (DSP) or any other processing circuit (or control circuit).

In some embodiments, the touch detection IC 130 further includes a fingerprint sensor 120 and coupled to the touch panel 110. Based on a design requirement, in another embodiment, the fingerprint sensor 120 may be disposed outside of the touch detection IC 130. In the embodiment illustrated in FIG. 1, the touch detection IC 130 is configured to drive the touch panel 110 to receive one or more touch signals St of the touch panel 110. The touch detection IC 130 is also configured to drive the fingerprint sensor 120 (either inside or outside the touch detection IC 130) to receive one or more fingerprint signals Sf of the fingerprint sensor 120.

Furthermore, the touch detection IC 130 includes a driving signal generation circuit 131 and a receiving circuit 132. The driving signal generation circuit 131 is configured to transmit one or more first driving signals 1TS to the touch panel 110 and transmit one or more second driving signals 2TS to the fingerprint sensor 120. The receiving circuit 132 may receive and process the touch signals St of the touch panel 110 during a first period. The receiving circuit 132 may receive and process the fingerprint signals Sf of the fingerprint sensor 120 during a second period. In some embodiment, the driving signal generation circuit 131 outputs the first driving signals 1TS to the touch panel 110 during the first period, and the driving signal generation circuit 131 outputs the second driving signals 2TS to the fingerprint sensor 120 during the second period.

According to the above description, the touch detection IC 130 illustrated in FIG. 1 provides the one or more first driving signals 1TS and the one or more second driving signals 2TS by using the driving signal generation circuit 131 to respectively drive the touch panel 110 and the fingerprint sensor 120. The receiving circuit 132 receives and processes the touch signals St generated by the touch panel 110 according to a drive timing of the driving signal generation circuit 131. In the same way, the receiving circuit 132 may also receive and process the fingerprint signals Sf generated by the fingerprint sensor 120 according to the drive timing of the driving signal generation circuit 131. With the use of the touch detection IC 130, not only the touch panel 110 but also the fingerprint sensor 120 can be driven/controlled. Thus, the touch detection IC can effectively save system cost of the touch apparatus 100.

Figure 2:
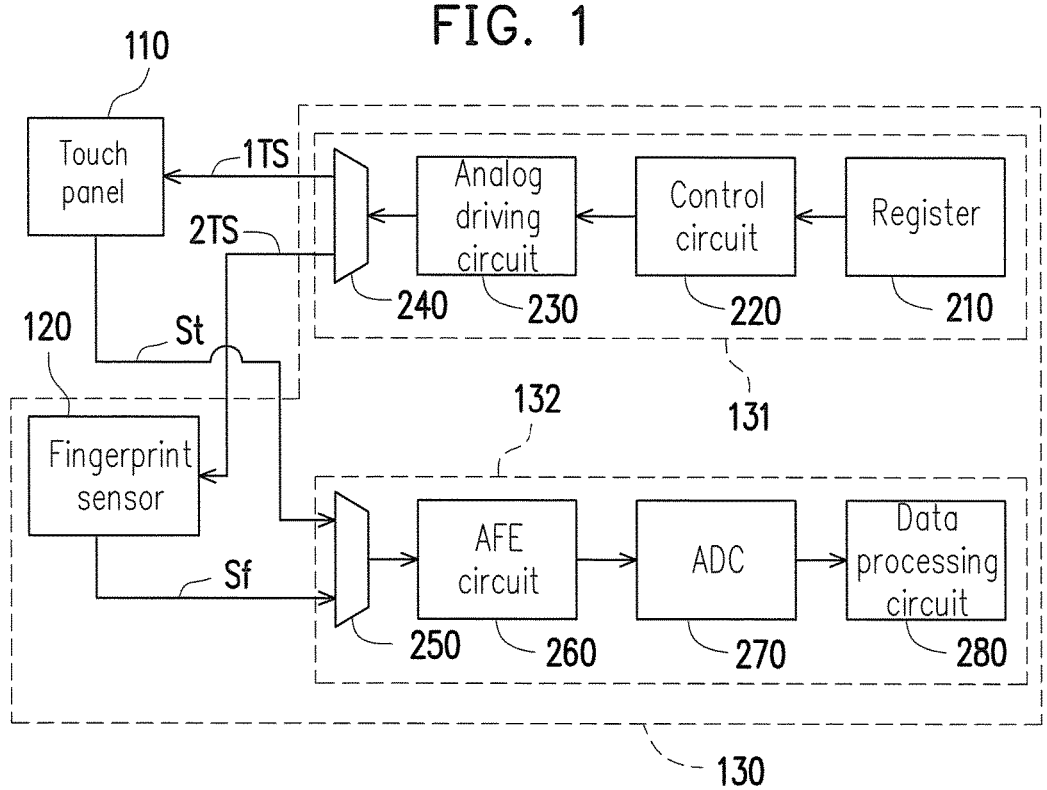
FIG. 2 is a schematic circuit block diagram illustrating the driving signal generation circuit and the receiving circuit depicted in FIG. 1 according to an embodiment of the invention.

FIG. 2 is a schematic circuit block diagram illustrating the driving signal generation circuit 131 and the receiving circuit 132 depicted in FIG. 1 according to an embodiment of the invention. In the embodiment illustrated in FIG. 2, the driving signal generation circuit 131 includes a register 210, a control circuit 220, an analog driving circuit 230 and a demultiplexer 240. The register 210 is configured to store first driving waveform data and second driving waveform data from the system processor 140. The system processor 140 may set the one or more first driving waveform data to determine the waveforms and/or frequencies of the first driving signals 1TS and set the one or more second driving waveform data to determine the waveforms and/or frequencies of the second driving signals 2TS.

Furthermore, the output terminals of the control circuit 220 are coupled to the input terminals of the analog driving circuit 230. The input terminals of the control circuit 220 are coupled to the register 210 to read the first driving waveform data and/or the second driving waveform data. During the first period, the control circuit 220 controls the analog driving circuit 230 according to the first driving waveform data to generate the corresponding first driving signals 1TS. During the second period, the control circuit 220 controls the analog driving circuit 230 according to the second driving waveform data to generate the corresponding second driving signals 2TS. The input terminals of the demultiplexer 240 are coupled to the output terminals of the analog driving circuit 230. The first output terminals of the demultiplexer 240 are coupled to the touch panel 110. The second output terminals of the demultiplexer 240 are coupled to the fingerprint sensor 120. During the first period, the demultiplexer 240 selects to transmit the one or more first driving signals 1TS generated by the analog driving circuit 230 to the touch panel 110. During the second period, the demultiplexer 240 selects to transmit the one or more second driving signals 2TS generated by the analog driving circuit 230 to the fingerprint sensor 120.

The touch panel 110 may be a capacitive touch panel, e.g., a conventional touch panel or a touch panel of any other type. The fingerprint sensor 120 may be a capacitive fingerprint sensor, e.g., a conventional fingerprint sensor or a fingerprint sensor of any other type. The touch panel 110 and the fingerprint sensor 120 may be different devices separated from each other. Based on a design requirement, in some embodiments, the touch detection IC 130 and the fingerprint sensor 120 may be disposed in the same chip. In some other embodiments, the touch detection IC 130 and the fingerprint sensor 120 may be different chips, but disposed in the same package. Based on a design requirement, in some embodiments, the touch detection IC 130 may be disposed on a flexible circuit board (not shown) and thereby, may be electrically connected to the touch panel 110 through the flexible circuit.

The implementation manner of the analog driving circuit 230 is not limited in the invention. For example, the analog driving circuit 230 may be one or more digital-to-analog converters configured to convert digital waveform data of the control circuit 220 into analog driving signals. In some embodiments, the analog driving circuit 230 may be one or more conventional driving signal generation circuits and thus, will not be repeatedly described. During the first period, the analog driving circuit 230 transmits the one or more first driving signals 1TS to one or more driving electrodes of the touch panel 110 through the demultiplexer 240, and the receiving circuit 132 synchronously receives/detects the touch signals St of one or more sensing electrodes of the touch panel 110. During the second period, the analog driving circuit 230 transmits the one or more second driving signals 2TS to one or more driving electrodes of the fingerprint sensor 120 through the demultiplexer 240, and the receiving circuit 132 synchronously receives/detects the one or more fingerprint signals Sf of one or more sensing electrodes of the fingerprint sensor 120.

In the embodiment illustrated in FIG. 2, the receiving circuit 132 includes a multiplexer 250, a set of analog front end (AFE) circuit 260, a set of analog-to-digital converter (ADC) 270 and a data processing circuit 280. The first input terminals of the multiplexer 250 are coupled to the sensing electrodes of the touch panel 110 to receive the touch signals St. The second input terminals of the multiplexer 250 are coupled to the sensing electrodes of the fingerprint sensor 120 to receive the fingerprint signals Sf. The output terminals of the multiplexer 250 are coupled to the input terminals of the AFE circuit 260. During the period of the one or more first driving signals 1TS being outputted to the touch panel 110 (i.e., the first period), the multiplexer 250 selects to transmit the touch signals St of the touch panel 110 to the input terminals of the AFE circuit 260 through the output terminals of the multiplexer 250. During the period of the second driving signals 2TS being outputted to the fingerprint sensor 120 (i.e., the second period), the multiplexer 250 selects to transmit the fingerprint signals Sf of the fingerprint sensor 120 to the input terminals of the AFE circuit 260 through the output terminals of the multiplexer 250.

Based on a design requirement, the AFE circuit 260 may include multiplexers, amplifiers, current-to-voltage circuits, voltage-to-current circuits, integrators and/or filters. For example, the AFE circuit 260 may be a conventional AFE circuit and thus, will not be repeatedly described. The AFE circuit 260 may pre-process the outputs of the multiplexer 250 (which refers to the touch signals St or the fingerprint signals Sf) in analog domain and transmit the pre-processed signals to the input terminals of the ADC 270.

The input terminals of the ADC 270 are coupled to the output terminals of the AFE circuit 260. The ADC 270 may convert the analog signals outputted by the AFE circuit 260 into digital signals. The ADC 270 receives the touch signals through the AFE circuit 260 and converts the touch signals into first digital data. The ADC 270 also receives the fingerprint signals through the AFE circuit 260 and converts the fingerprint signals into second digital data.

The input terminals of the data processing circuit 280 are coupled to output terminals of the ADC 270 to receive the first digital data and the second digital data. In some embodiments, the data processing circuit 280 may provide the first digital data and the second digital data to the system processor 140 outside the touch detection IC 130 through an interface (e.g., a GPIO). In some other embodiments, the data processing circuit 280 may perform digital signal processing on the first digital data and the second digital data to calculate respective sensing results.

In the present embodiment, the data processing circuit 280 may process the first digital data by executing an algorithm to acquire a position (coordinate) and/or a moving speed of a touch event on the touch panel 110. The data processing circuit 280 may also process the second digital data to acquire a fingerprint frame. In some embodiments, the data processing circuit 280 may transmit the fingerprint frame to the system processor 140 through the interface (e.g., the GPIO). Then, the system processor 140 may process the fingerprint frame by executing an algorithm, such that a plurality of fingerprint features may be further captured from the fingerprint frame, and identity information of a user may be determined according to the fingerprint features. In some other embodiments, the data processing circuit 280 may further capture a plurality of fingerprint features from the fingerprint frame and transmit the fingerprint features to the system processor 140 through the interface (e.g., the GPIO).

Figure 3:
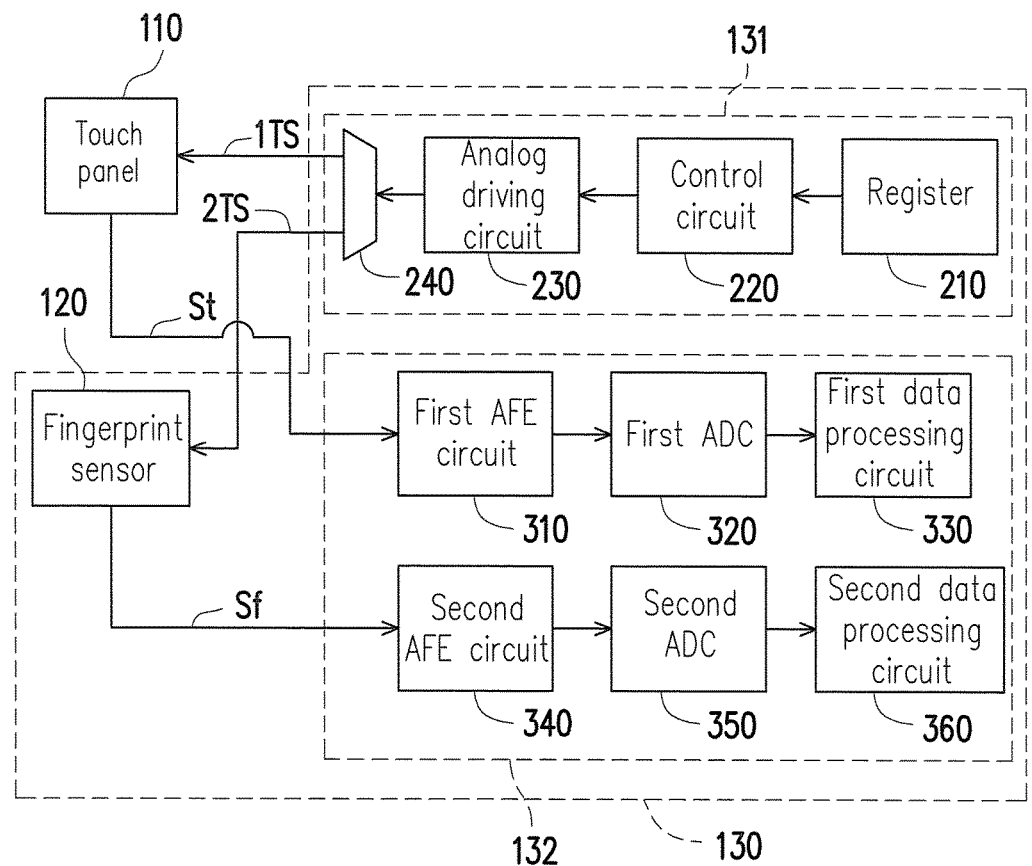
FIG. 3 is a schematic circuit block diagram illustrating the receiving circuit depicted in FIG. 1 according to another embodiment of the invention.

FIG. 3 is a schematic circuit block diagram illustrating the receiving circuit 132 depicted in FIG. 1 according to another embodiment of the invention. The touch panel 110, the fingerprint sensor 120 and the driving signal generation circuit 131 illustrated in FIG. 3 may be derived with reference to the description related to the embodiments illustrated in FIG. 2. In the embodiment illustrated in FIG. 3, the receiving circuit 132 includes a first AFE circuit 310, a first ADC 320, a first data processing circuit 330, a second AFE circuit 340, a second ADC 350 and a second data processing circuit 360. The first AFE circuit 310 and the second AFE circuit 340 illustrated in FIG. 3 may be derived with reference to the description related to the AFE circuit 260 illustrated in FIG. 2 and thus, will not be repeatedly described.

The first input terminals of the first AFE circuit 310 are coupled to the sensing electrodes of the touch panel 110 to receive the touch signals St. The output terminals of the first AFE circuit 310 are coupled to the input terminals of the first ADC 320. The first AFE circuit 310 may pre-process the touch signals St of the touch panel 110 in the analog domain and then, transmit the pre-processed signals to the input terminals of the first ADC 320. The first ADC 320 may receive the pre-processed touch signals through the first AFE circuit 310 and convert the analog signals (i.e., touch signals) outputs by the first AFE circuit 310 into the first digital data. The output terminals of the first ADC 320 are coupled to the input terminals of the first data processing circuit 330 to receive the first digital data. In some embodiments, the first data processing circuit 330 may provide the first digital data to the system processor 140 outside the touch detection IC 130 through the interface (e.g., a GPIO). In some other embodiments, the first data processing circuit 330 may perform digital signal processing on the first digital data to calculate a sensing value of each pixel, so as to acquire a position of a touch event on the touch panel 110.

The input terminals of the second AFE circuit 340 are coupled to the sensing electrodes of the fingerprint sensor 120 to receive the fingerprint signals Sf. The output terminals of the second AFE circuit 340 are coupled to the input terminals of the second ADC 350. The second AFE circuit 340 may pre-process the fingerprint signals Sf of the fingerprint sensor 120 in the analog domain and then, transmit the pre-processed signals to the input terminals of the second ADC 350. The second ADC 350 may receive the pre-processed fingerprint signals through the second AFE circuit 340 and convert the analog signals (i.e., a fingerprint signals) output by the second AFE circuit 340 into the second digital data. The output terminals of the second ADC 350 are coupled to the input terminals of the second data processing circuit 360 to receive the second digital data. In some embodiments, the second data processing circuit 360 may provide the second digital data to the system processor 140 outside the touch detection IC 130 through the interface (e.g., the GPIO). In some other embodiments, the second data processing circuit 360 may perform digital signal processing on the second digital data to calculate a sensing value of each pixel of the fingerprint sensor 120 to obtain a fingerprint frame. The second data processing circuit 360 may transmit the fingerprint frame to the system processor 140 through the interface (e.g., the GPIO). Then, the system processor 140 may process the fingerprint frame by executing an algorithm, such that a plurality of fingerprint features are captured from the fingerprint frame, and identity information of the user may be determined according to the fingerprint features.

Figure 4:
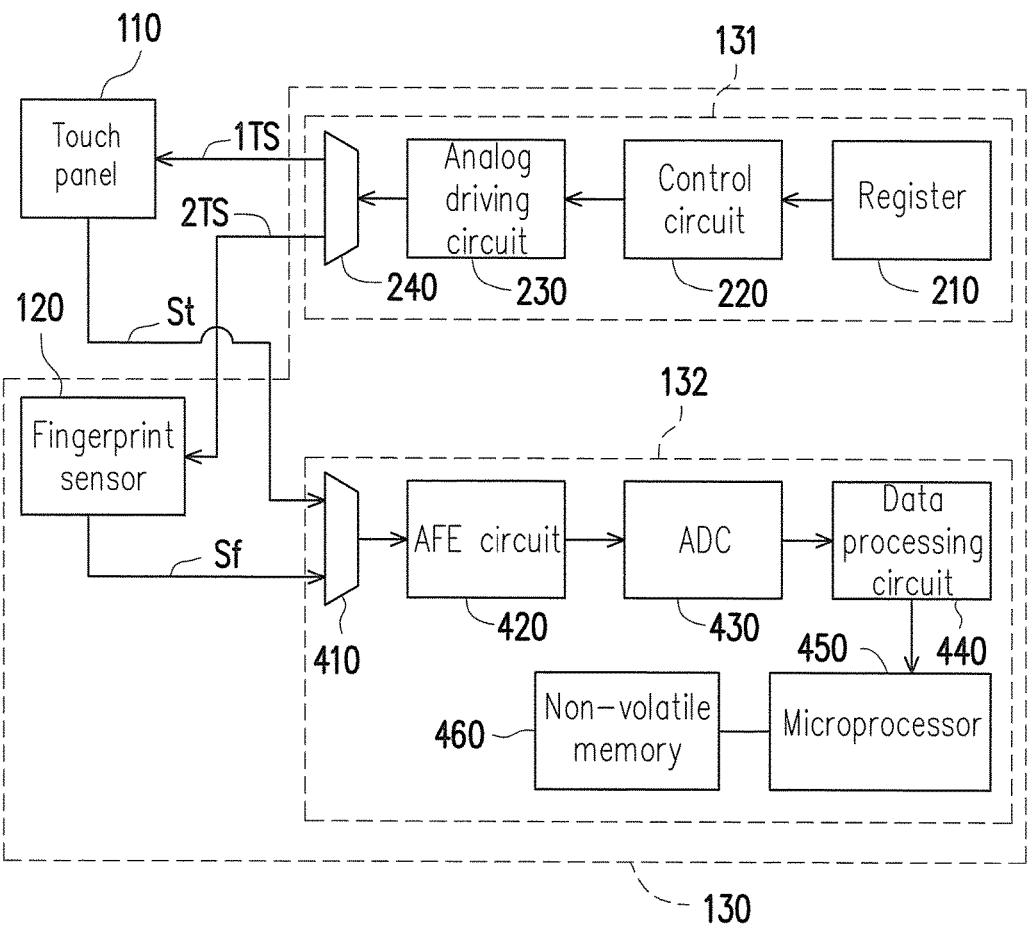
FIG. 4 is a schematic circuit block diagram illustrating the receiving circuit depicted in FIG. 1 according to yet another embodiment of the invention.

FIG. 4 is a schematic circuit block diagram illustrating the receiving circuit 132 depicted in FIG. 1 according to yet another embodiment of the invention. In the embodiment illustrated in FIG. 4, the driving signal generation circuit 131 includes a register 210, a control circuit 220, an analog driving circuit 230 and a demultiplexer 240. The touch panel 110, the fingerprint sensor 120, the driving signal generation circuit 131, the register 210, the control circuit 220, the analog driving circuit 230 and the demultiplexer 240 may be derived with reference to the description related to the embodiment illustrated in FIG. 2 and thus, will not be repeatedly described.

The receiving circuit 132 illustrated in FIG. 4 includes a multiplexer 410, an AFE circuit 420, an ADC 430, a data processing circuit 440, a microprocessor 450 and a non-volatile memory 460. The multiplexer 410, the AFE circuit 420, the ADC 430 and the data processing circuit 440 illustrated in FIG. 4 may be derived with reference to the description related to the multiplexer 250, the AFE circuit 260, the ADC 270 and the data processing circuit 280 illustrated in FIG. 2. The ADC 430 may receive the touch signals St of the touch panel 110 through the multiplexer 410 and the AFE circuit 420 and convert the pre-processed touch signals into the first digital data. The ADC 430 may also receive the fingerprint signals Sf of the fingerprint sensor 120 through the multiplexer 410 and the AFE circuit 420 and convert the pre-processed fingerprint signals into the second digital data. The input terminals of the data processing circuit 440 are coupled to the output terminals of the ADC 430 to receive the first digital data and the second digital data. The first data processing circuit 440 may perform digital signal processing on the first digital data to calculate a sensing value of each pixel of the touch panel 110 for obtaining a first processed digital data. The first data processing circuit 440 may also perform digital signal processing on the second digital data to calculate a sensing value of each pixel of the fingerprint sensor 120.

In other embodiment, the data processing circuit 440 may process the first digital data by executing an algorithm to acquire a position (coordinate) and/or a moving speed of a touch event on the touch panel 110. The data processing circuit 440 may transmit the position (and/or the moving speed) of the touch event on the touch panel 110 to the system processor 140 through an interface (e.g., a GPIO). In the embodiment illustrated in FIG. 4, the data processing circuit 440 may process the first digital data to obtain the first processed digital data. An input terminal of the microprocessor 450 is coupled to the output terminal of the data processing circuit 440 to receive the first processed digital data to acquire a position (coordinate) and/or a moving speed of a touch event on the touch panel 110. The data processing circuit 440 may also process the second digital data to acquire a fingerprint frame. The input terminal of the microprocessor 450 is coupled to an output terminal of the data processing circuit 440 to receive the fingerprint frame.

The non-volatile memory 460 stores the algorithm code (i.e., a software code or a firmware code) used for touch calculation and/or fingerprint recognition. The microprocessor 450 is also coupled to the non-volatile memory 460 to read and execute the algorithm code. Or the code in the non-volatile memory 460 will be loaded to a faster memory (not shown in FIG. 4) that operates with the microprocessor 450. Based on computation of the algorithm code of touch calculation, the microprocessor 450 may acquire the touch position (coordinate) and/or a moving speed of a touch event on the touch panel 110. Based on computation of the algorithm code of fingerprint recognition, the microprocessor 450 may capture a plurality of fingerprint features from the fingerprint frame. Thereby, the microprocessor 450 may recognize the fingerprint frame to generate a fingerprint recognition result. The microprocessor 450 may transmit the fingerprint recognition result to the system processor 140 through an interface (e.g., a GPIO).

Figure 5:
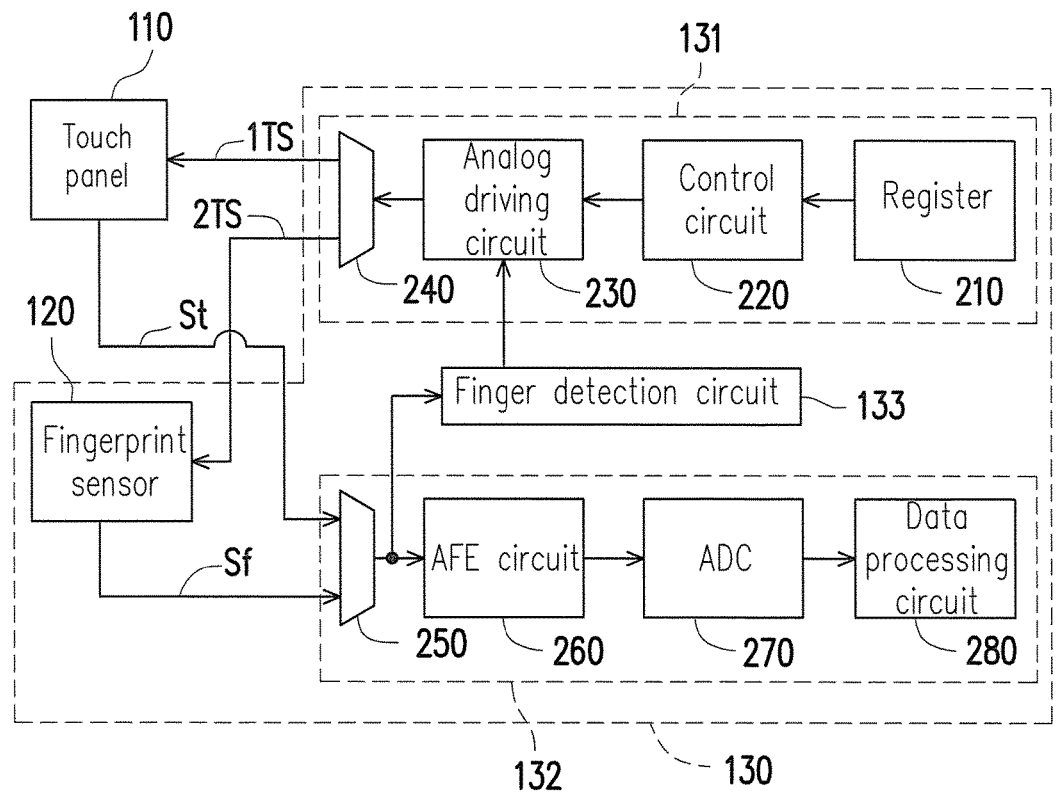
FIG. 5 is a schematic circuit block diagram illustrating the touch detection integrated circuit (IC) depicted in FIG. 1 according to still another embodiment of the invention.

FIG. 5 is a schematic circuit block diagram illustrating the touch detection IC 130 depicted in FIG. 1 according to still another embodiment of the invention. The touch detection IC 130 illustrated in FIG. 5 includes a driving signal generation circuit 131, a receiving circuit 132 and a finger detection circuit 133. The touch panel 110, the fingerprint sensor 120, the driving signal generation circuit 131 and the receiving circuit 132 illustrated in FIG. 5 may be derived with reference to the description related to the embodiments illustrated in FIG. 2 and thus, will not be repeatedly described. In the embodiment illustrated in FIG. 5, the finger detection circuit 133 is coupled to the analog driving circuit 230 of the driving signal generation circuit 131 and the multiplexer 250 of the receiving circuit 132. The finger detection circuit 133 is configured to monitor whether a finger touch event occurs to the touch panel 110, so to determine whether to enable the driving signal generation circuit 131 to output the first driving signals 1TS. In other words, when no finger touch event occurs to the touch panel 110, the driving signal generation circuit 131 may not have to output the first driving signals 1TS and so saves power consumption. Otherwise, when a finger touch event occurs to the touch panel 110, the analog driving circuit 131 may instantly transmit the first driving signals 1TS to the driving electrode of the touch panel 110.

The finger detection circuit 133 may also monitor whether the fingerprint sensor 120 is touched, so to determine whether to enable the driving signal generation circuit 131 to output the second driving signals 2TS. In other words, when the fingerprint sensor 120 is not touched by the finger, the driving signal generation circuit 131 may not have to output the second driving signals 2TS and so saves power consumption. Otherwise, when the fingerprint sensor 120 is touched by the finger, the analog driving circuit 131 may instantly transmit the second driving signals 2TS to the driving electrode of the fingerprint sensor 120.

In the above embodiments, the functions described in the invention can be implemented by hardware, software and firmware. The register described above may be a memory card, a flash memory or any other memory apparatus. In terms of the hardware or software implementation, various exemplary logics, logical blocks, modules and circuits of the processing unit may be implemented or executed in combination with the aspects illustrated in the embodiments of the invention in the electronic devices (e.g., ASIC, DSP, DSPD, FPGA, transistor logics, amplifiers, comparators, controllers, micro-controllers, microprocessors) which are designed for performing the functions described herein.

Based on the above, the touch detection IC provided by the embodiments of the invention can be applied to the touch panel and the fingerprint sensor. The touch panel and the fingerprint sensor can share the same set of the driving signal generation circuit and the receiving circuit. Thus, the touch detection IC can effectively save system cost of the touch apparatus.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A touch detection integrated circuit, configured to drive a touch panel to receive at least one touch signal of the touch panel and drive a fingerprint sensor to receive at least one fingerprint signal of the fingerprint sensor, the touch detection integrated circuit comprising:
    a driving signal generation circuit, configured to transmit at least one first driving signal to the touch panel and transmit at least one second driving signal to the fingerprint sensor,
    wherein the driving signal generation circuit comprises:
        an analog driving circuit, having an input terminal and an output terminal;
        a register, configured to store first driving waveform data and second driving waveform data;
        a control circuit, having an input terminal coupled to the register to read the first driving waveform data or the second driving waveform data stored in the register and an output terminal coupled to the input terminal of the analog driving circuit, controlling the analog driving circuit according to the first driving waveform data to generate the first driving signal during a first period, and controlling the analog driving circuit according to the second driving waveform data to generate the second driving signal during a second period, wherein the first driving signal is different from the second driving signal; and a demultiplexer, having an input terminal coupled to the output terminal of the analog driving circuit, a first output terminal coupled to the touch panel and a second output terminal coupled to the fingerprint sensor, selecting to transmit the first driving signal generated by the analog driving circuit to the touch panel during the first period and selecting to transmit the second driving signal generated by the analog driving circuit to the fingerprint sensor during the second period; and at least one receiving circuit, configured to receive and process the touch signal of the touch panel during the first period, and receive and process the fingerprint signal of the fingerprint sensor during the second period.

2. The touch detection integrated circuit according to claim 1, wherein the driving signal generation circuit is configured to transmit the first driving signal to the touch panel during the first period, and transmit the second driving signal to the fingerprint sensor during the second period.

3. The touch detection integrated circuit according to claim 1, wherein the receiving circuit comprises:

a multiplexer, having a first input terminal coupled to the touch panel and a second input terminal coupled to the fingerprint sensor, selecting to transmit the touch signal of the touch panel to an output terminal of the multiplexer during the period of the first driving signal being output to the touch panel, and selecting to transmit the fingerprint signal of the fingerprint sensor to the output terminal of the multiplexer during the period of the second driving signal being output to the fingerprint sensor;

an analog front-end (AFE) circuit, having an input terminal coupled to the output terminal of the multiplexer;

an analog-to-digital converter (ADC), having an input terminal coupled to an output terminal of the AFE circuit, receiving the touch signal through the AFE circuit and converting the touch signal into first digital data, and receiving the fingerprint signal through the AFE circuit and converting the fingerprint signal into second digital data; and a data processing circuit, having an input terminal coupled to an output terminal of the ADC to receive the first digital data and the second digital data.

4. The touch detection integrated circuit according to claim 3, wherein the data processing circuit processes the first digital data to acquire a position of a touch event on the touch panel and processes the second digital data to obtain a fingerprint frame.

5. The touch detection integrated circuit according to claim 4, wherein the data processing circuit further captures a plurality of fingerprint features from the fingerprint frame.

6. The touch detection integrated circuit according to claim 3, wherein the data processing circuit provides the first digital data and the second digital data to a system processor outside the touch detection integrated circuit.

7. The touch detection integrated circuit according to claim 1, wherein the receiving circuit comprises:

a first AFE circuit, having an input terminal coupled to the touch panel to receive the touch signal;

a second AFE circuit, having an input terminal coupled to the fingerprint sensor to receive the fingerprint signal;

a first analog-to-digital converter (ADC), having an input terminal coupled to an output terminal of the first AFE circuit, receiving the touch signal through the first AFE circuit and converting the touch signal into first digital data;

a second ADC, having an input terminal coupled to an output terminal of the second AFE circuit, receiving the fingerprint signal through the second AFE circuit and converting the fingerprint signal into second digital data;

a first data processing circuit, having an input terminal coupled to an output terminal of the first ADC to receive the first digital data and processing the first digital data to acquire a position of a touch event on the touch panel; and a second data processing circuit, having an input terminal coupled to an output terminal of the second ADC to receive the second digital data and processing the second digital data to obtain a fingerprint frame.

8. The touch detection integrated circuit according to claim 1, wherein the receiving circuit comprises:

a multiplexer, having a first input terminal coupled to the touch panel and a second input terminal coupled to the fingerprint sensor, selecting to transmit the touch signal of the touch panel to an output terminal of the multiplexer during the period of the first driving signal being output to the touch panel, and selecting to transmit the fingerprint signal of the fingerprint sensor to the output terminal of the multiplexer during the period of the second driving signal being output to the fingerprint sensor;

an AFE circuit, having an input terminal coupled to the output terminal of the multiplexer;

an analog-to-digital converter (ADC), having an input terminal coupled to an output terminal of the AFE circuit, receiving the touch signal through the AFE circuit and converting the touch signal into first digital data, and receiving the fingerprint signal through the AFE circuit and converting the fingerprint signal into second digital data;

a data processing circuit, having an input terminal coupled to an output terminal of the ADC to receive the first digital data and the second digital data, processing the first digital data to obtain a first processed digital data, and processing the second digital data to obtain a fingerprint frame; and a microprocessor, having an input terminal coupled to an output terminal of the data processing circuit to receive the first processed digital data to acquire a position of a touch event on the touch panel, or to receive the fingerprint frame, and configured to recognize the fingerprint frame to generate a fingerprint recognition result.

9. The touch detection integrated circuit according to claim 1, further comprising:

a finger detection circuit, coupled to the driving signal generation circuit and the receiving circuit and configured to monitor whether a finger touch event occurs to the touch panel, so as to determine whether to enable the driving signal generation circuit to output the first driving signal, and monitor whether the fingerprint sensor is touched, so as to determine whether to enable the driving signal generation circuit to output the second driving signal.

10. The touch detection integrated circuit according to claim 1, wherein the touch detection integrated circuit and the fingerprint sensor are disposed in the same package.

11. A touch apparatus, comprising:
a system processor;
a touch panel;
a fingerprint sensor;
a touch detection integrated circuit, coupled to the touch panel, coupled to the system processor through an interface, and configured to drive the touch panel to receive at least one touch signal of the touch panel and drive the fingerprint sensor to receive at least one fingerprint signal of the fingerprint sensor, wherein the touch detection integrated circuit comprises:
a driving signal generation circuit, configured to transmit at least one first driving signal to the touch panel and transmit at least one second driving signal to the fingerprint sensor,
wherein the driving signal generation circuit comprises:
an analog driving circuit, having an input terminal and an output terminal;
a register, configured to store first driving waveform data and second driving waveform data;
a control circuit, having an input terminal coupled to the register to read the first driving waveform data or the second driving waveform data stored in the register and an output terminal coupled to the input terminal of the analog driving circuit, controlling the analog driving circuit according to the first driving waveform data to generate the first driving signal during a first period, and controlling the analog driving circuit according to the second driving waveform data to generate the second driving signal during a second period, wherein the first driving signal is different from the second driving signal; and
a demultiplexer, having an input terminal coupled to the output terminal of the analog driving circuit, a first output terminal coupled to the touch panel and a second output terminal coupled to the fingerprint sensor, selecting to transmit the first driving signal generated by the analog driving circuit to the touch panel during the first period and selecting to transmit the second driving signal generated by the analog driving circuit to the fingerprint sensor during the second period; and
at least one receiving circuit, configured to receive and process the touch signal of the touch panel during the first period, and receive and process the fingerprint signal of the fingerprint sensor during the second period.

12. The touch apparatus according to claim 11, wherein the driving signal generation circuit is configured to transmit the first driving signal to the touch panel during the first period, and transmit the second driving signal to the fingerprint sensor during the second period.

13. The touch apparatus according to claim 11, wherein the receiving circuit comprises:
a multiplexer, having a first input terminal coupled to the touch panel and a second input terminal coupled to the fingerprint sensor, selecting to transmit the touch signal of the touch panel to an output terminal of the multiplexer during the period of the first driving signal being output to the touch panel, and selecting to transmit the fingerprint signal of the fingerprint sensor to the output terminal of the multiplexer during the period of the second driving signal being output to the fingerprint sensor;
an AFE circuit, having an input terminal coupled to the output terminal of the multiplexer;
an analog-to-digital converter (ADC), having an input terminal coupled to an output terminal of the AFE circuit, receiving the touch signal through the AFE circuit and converting the touch signal into first digital data, and receiving the fingerprint signal through the AFE circuit and converting the fingerprint signal into second digital data; and
a data processing circuit, having an input terminal coupled to an output terminal of the ADC to receive the first digital data and the second digital data.

14. The touch apparatus according to claim 13, wherein the data processing circuit processes the first digital data to acquire a position of a touch event on the touch panel and processes the second digital data to obtain a fingerprint frame.

15. The touch apparatus according to claim 14, wherein the data processing circuit further captures a plurality of fingerprint features from the fingerprint frame.

16. The touch apparatus according to claim 13, wherein the data processing circuit provides the first digital data and the second digital data to the system processor.

17. The touch apparatus according to claim 11, wherein the receiving circuit comprises:
a first AFE circuit, having an input terminal coupled to the touch panel to receive the touch signal;
a second AFE circuit, having an input terminal coupled to the fingerprint sensor to receive the fingerprint signal;
a first analog-to-digital converter (ADC), having an input terminal coupled to an output terminal of the first AFE circuit, receiving the touch signal through the first AFE circuit and converting the touch signal into first digital data;
a second ADC, having an input terminal coupled to an output terminal of the second AFE circuit, receiving the fingerprint signal through the second AFE circuit and converting the fingerprint signal into second digital data;
a first data processing circuit, having an input terminal coupled to an output terminal of the first ADC to receive the first digital data and processing the first digital data to acquire a position of a touch event on the touch panel; and
a second data processing circuit, having an input terminal coupled to an output terminal of the second ADC to receive the second digital data and processing the second digital data to obtain a fingerprint frame.

18. The touch apparatus according to claim 11, wherein the receiving circuit comprises:
a multiplexer, having a first input terminal coupled to the touch panel and a second input terminal coupled to the fingerprint sensor, selecting to transmit the touch signal of the touch panel to an output terminal of the multiplexer during the period of the first driving signal being output to the touch panel, and selecting to transmit the fingerprint signal of the fingerprint sensor to the output terminal of the multiplexer during the period of the second driving signal being output to the fingerprint sensor;
an AFE circuit, having an input terminal coupled to the output terminal of the multiplexer;
an analog-to-digital converter (ADC), having an input terminal coupled to an output terminal of the AFE circuit, receiving the touch signal through the AFE circuit and converting the touch signal into first digital data, and receiving the fingerprint signal through the AFE circuit and converting the fingerprint signal into second digital data;

a data processing circuit, having an input terminal coupled to an output terminal of the ADC to receive the first digital data and the second digital data, processing the first digital data to obtain a first processed digital data, and processing the second digital data to obtain a fingerprint frame; and a microprocessor, having an input terminal coupled to an output terminal of the data processing circuit to receive the first processed digital data to acquire a position of a touch event on the touch panel, or to receive the fingerprint frame and configured to recognize the fingerprint frame to generate a fingerprint recognition result.

19. The touch apparatus according to claim 11, wherein the touch detection integrated circuit further comprises:

a finger detection circuit, coupled to the driving signal generation circuit and the receiving circuit and configured to monitor whether a finger touch event occurs to the touch panel, so as to determine whether to enable the driving signal generation circuit to output the first driving signal, and monitor whether the fingerprint sensor is touched, so as to determine whether to enable the driving signal generation circuit to output the second driving signal.

20. The touch apparatus according to claim 11, wherein the touch detection integrated circuit and the fingerprint sensor are disposed in the same package.

21. The touch apparatus according to claim 11, wherein the touch detection integrated circuit is disposed on a flexible circuit board and electrically connected to the touch panel through the flexible circuit board.

* * * * *